United States Patent
Teng et al.

(10) Patent No.: US 10,060,058 B2
(45) Date of Patent: Aug. 28, 2018

(54) HYBRID NONWOVEN MATS AND METHODS

(71) Applicant: Georgia-Pacific Gypsum LLC, Atlanta, GA (US)

(72) Inventors: Yi-Hsien Harry Teng, Duluth, GA (US); Christopher J. Sanders, Southaven, MS (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 238 days.

(21) Appl. No.: 14/941,788

(22) Filed: Nov. 16, 2015

(65) Prior Publication Data

US 2016/0145779 A1 May 26, 2016

Related U.S. Application Data

(60) Provisional application No. 62/082,796, filed on Nov. 21, 2014.

(51) Int. Cl.

| | | |
|---|---|---|
| *D04H 1/42* | (2012.01) | |
| *D04H 1/64* | (2012.01) | |
| *D21H 13/40* | (2006.01) | |
| *D21H 19/12* | (2006.01) | |
| *D21H 27/18* | (2006.01) | |
| *D21H 27/38* | (2006.01) | |
| *D04H 1/4218* | (2012.01) | |
| *B32B 13/14* | (2006.01) | |
| *D04H 1/4374* | (2012.01) | |
| *D04H 1/4382* | (2012.01) | |
| *D04H 1/732* | (2012.01) | |

(52) U.S. Cl.
CPC ........... *D04H 1/4218* (2013.01); *B32B 13/14* (2013.01); *D04H 1/4374* (2013.01); *D04H 1/4382* (2013.01); *D04H 1/64* (2013.01); *D04H 1/732* (2013.01); *D21H 13/40* (2013.01); *D21H 19/12* (2013.01); *D21H 27/18* (2013.01); *D21H 27/38* (2013.01)

(58) Field of Classification Search
CPC ........ D21H 13/10; D21H 13/36; D21H 13/40; D21H 19/12; D21H 27/18; D21H 27/30; D21H 27/38; D04H 1/04; D04H 1/26; D04H 1/32; D04H 1/40; D04H 1/4209; D04H 1/4266; D04H 1/4326; D04H 1/4374; D04H 1/4382; D04H 1/64
USPC ....... 162/123, 125, 129, 130, 132, 133, 135, 162/141, 148, 149
See application file for complete search history.

(56) References Cited

U.S. PATENT DOCUMENTS

| | | | | |
|---|---|---|---|---|
| 6,187,697 B1 * | 2/2001 | Jaffee | ......... | B32B 5/24 442/149 |
| 7,989,370 B2 * | 8/2011 | Currier | ....... | B32B 7/02 422/180 |

(Continued)

FOREIGN PATENT DOCUMENTS

EP 2781652 * 9/2014 ............. D04H 1/425

*Primary Examiner* — Eric Hug
(74) *Attorney, Agent, or Firm* — Ram W. Sabnis (57) ABSTRACT

Hybrid nonwoven mats are made by depositing a slurry of fibers and water onto a fibrous web and applying a binder onto the hybrid nonwoven mat formed therefrom. The fibers are sized and present in an amount such that the binder forms a substantially continuous film on the hybrid nonwoven mat. Gypsum panels may be faced with a hybrid nonwoven mat on one or both surfaces.

19 Claims, 3 Drawing Sheets

(56) References Cited

U.S. PATENT DOCUMENTS

| | | | |
|---|---|---|---|
| 2006/0068186 A1* | 3/2006 | Leclercq | B32B 5/022 |
| | | | 428/294.7 |
| 2007/0012414 A1* | 1/2007 | Kajander | D21F 11/04 |
| | | | 162/129 |
| 2007/0032157 A1* | 2/2007 | McGrath | C03C 25/323 |
| | | | 442/381 |
| 2007/0039703 A1* | 2/2007 | Lee | C03C 25/16 |
| | | | 162/156 |
| 2007/0141931 A1* | 6/2007 | Nandi | B32B 5/26 |
| | | | 442/59 |
| 2009/0029141 A1* | 1/2009 | Shake | B28B 19/0092 |
| | | | 428/293.4 |

* cited by examiner

HYBRID NONWOVEN MATS AND METHODS

CROSS-REFERENCE TO RELATED APPLICATIONS

This application claims priority to U.S. Provisional Application No. 62/082,796, filed Nov. 21, 2014, which is incorporated by reference herein.

FIELD

The present invention relates generally to the field of nonwoven mats for use in building material and construction applications, and more particularly to hybrid nonwoven mats, hybrid mat-faced panels, and methods of manufacturing the same.

BACKGROUND

Wall boards, such as gypsum or foam board panels, are used in building construction to form the partitions or walls of rooms, hallways, ceilings, and the like. Similar boards are also used in exterior wall or roof construction, such as sheathing or roof deck. These panels may include mats, such as fiberglass or other woven or nonwoven mats, on one or both faces to enhance the performance properties of the board, such as board strength, rigidity, weather durability, and moisture or mold resistance. For example, these mats may be used in place of traditional paper facings. In addition, fiberglass or other woven or nonwoven mats are used by laminating or impregnating with membranes or tiles for roofing, flooring, and ceiling applications. Such woven or nonwoven mats may be manufactured in-line with the wall board or independently thereof.

One common issue with such mat-faced boards, such as fiberglass-faced gypsum boards, is that fiber disengagement tends to occur at the surface of the board, causing itchiness and fiber dusting. Moreover, the exposed mat surface is abrasive and brittle, which leads to issues with handling and integrity. To attempt to alleviate these issues, a binder may be applied to the surface of the fiberglass mat, to attempt to form a protective layer during mat manufacturing processes. However, application of a binder on the fiberglass mat is typically of limited effectiveness due to the high porosity of the glass mat, which leads to non-uniform, discontinuous coverage of the binder on the mat, which results in significant gypsum slurry bleed-through.

Accordingly, it would be desirable to provide nonwoven mats and mat-faced panels having improved properties, such as improved surface protection and smoothness, reduced itchiness and/or fiber disengagement, and decreased porosity of the exterior mat surface to contain gypsum slurry bleed-through, as well as methods for producing such improved mats and mat-faced panels.

SUMMARY

In one aspect, methods of making a hybrid nonwoven mat are provided, including depositing a slurry of fibers selected from polymer fibers, natural fibers, glass microfibers, and combinations thereof, and water onto a fibrous web to form a hybrid nonwoven mat, and applying a binder onto the hybrid nonwoven mat to form a binder-coated hybrid nonwoven mat, wherein the fibers are sized and deposited in an amount such that the binder forms a substantially continuous film on the hybrid nonwoven mat.

In another aspect, hybrid nonwoven mats are provided, including a nonwoven fibrous mat, fibers selected from polymer fibers, natural fibers, glass microfibers, and combinations thereof, dispersed on the nonwoven fibrous mat in a nonwoven configuration, and a binder coating a surface of the fibers opposite the nonwoven fibrous mat, wherein the fibers are sized and present in an amount such that the binder forms a substantially continuous film.

In yet another aspect, gypsum panels are provided, including a gypsum core having two surfaces, wherein at least one of the surfaces is faced with a hybrid nonwoven mat that includes a nonwoven fibrous mat, fibers selected from polymer fibers, natural fibers, glass microfibers, and combinations thereof, dispersed on the nonwoven fibrous mat, and a binder coating a surface of the fibers opposite the nonwoven fibrous mat, wherein the fibers are sized and present in an amount such that the binder forms a substantially continuous film.

BRIEF DESCRIPTION OF THE DRAWINGS

Referring now to the drawings, which are meant to be exemplary and not limiting, and wherein like elements are numbered alike.

DETAILED DESCRIPTION

Disclosed herein are hybrid nonwoven mats and mat-faced panels, and methods for manufacturing such mats and panels. These hybrid nonwoven mats and mat-faced panels provide one or more improvements over known mats and mat-faced panels, such as: (i) enhanced mat strength and toughness, (ii) improved binder coating coverage and uniformity, (iii) improved mat surface smoothness and hand feel, (iv) reduced bleeding of panel core materials or adhesives through the mat, (v) decreased water penetration and absorption in panel core materials, (vi) reduced water erosion of panel core material and risk of weathering failure, (vii) improved overall board strength and toughness, (viii) improved surface abrasion resistance, and (ix) enhanced bonding between the mat and the panel core material.

Methods

Methods of making a hybrid nonwoven mat are disclosed herein. In certain embodiments, a method of making a hybrid nonwoven mat includes depositing a slurry of fibers and water onto a fiberglass or other fibrous web to form a hybrid nonwoven mat, and applying a binder onto the hybrid nonwoven mat to form a binder-coated hybrid nonwoven mat, wherein the fibers are sized and deposited in an amount such that the binder forms a substantially continuous film on the hybrid nonwoven mat.

As used herein, the phrase "substantially continuous film" refers to the binder having a continuous, nearly continuous, or semi-continuous (i.e., locally continuous) morphology containing porosity. For example, the fibers may be selected such that they are sized (e.g., have suitable average diameter, length, and/or aspect ratio) and deposited in an amount such that a desirable binder coating morphology, degree of porosity, or other physical properties may be obtained in the hybrid nonwoven mat. For example, the fibers may be selected such that the coated hybrid mat displays an air permeability of less than 200 ft$^3$/ft$^2$/min. The fibers may also be selected such that they display suitable strength properties. For example, the fibers may be shorter or longer than the web fibers of the fibrous web, such as from about 20 percent to about 150 percent of the length of the web fibers of the fibrous web. In one embodiment, the fibers have a length from about 20 percent to about 75 percent of the length of the web fibers of the fibrous web.

In certain embodiments, the fibers are present in the slurry in an amount from about 0.01 to about 2 percent by weight of the slurry. In one embodiment, the fibers are present in the slurry in an amount from about 0.05 to about 0.5 percent by weight of the slurry. In certain embodiments, the fibers are deposited onto the fibrous web in an amount from about 0.1 to about 10 percent by weight of the fibrous web. In one embodiment, the fibers are deposited onto the fibrous web in an amount from about 1 to about 2 percent by weight of the fibrous web.

In certain embodiments, the fibers are polymer fibers, natural fibers, glass microfibers, or combinations thereof. In certain embodiments, the polymer fibers are aramid (e.g., Kevlar, Nomex, Twaron), polyester, polypropylene, acrylics, nylon, cellulose, melamine, polyolefin, rayon, or combinations thereof. For example, the glass microfibers may have an average diameter of from about 1 micron to about 7 micron. For example, the glass microfibers may be produced via melt spinning. For example, the natural fibers may include wood pulp, flax, jute, kenaf, hemp ramie, rattan, vine fibers, or combinations thereof.

For example, the fibers may have an average aspect ratio from about 100 to about 30,000. In certain embodiments, the fibers have an average length from about 0.1 inch to about 1.5 inch. In one embodiment, the fibers have an average length from about ⅛ inch to about ½ inch. In certain embodiments, the fibers have an average diameter from about ⅛ inch to about ¼ inch. In certain embodiments, the fibers have an average diameter from about 0.5 micron to about 30 microns.

As used herein, the terms "web" and "mat" are generally used to refer to fibrous material(s). In certain instances, the term "web" more specifically refers to an intermediate or unfinished fibrous material (e.g., a wet fibrous material or the fibrous material prior to application of the fibers thereon) that forms a mat or is a mat precursor. In certain embodiments, the fibrous web onto which the fiber slurry is applied includes glass fibers, carbon fibers, ceramic fibers, natural fibers, polymer fibers, or a combination thereof. For example, the web or mat fibers may have a length of at least ¼ inch. In certain embodiments, the mats include a nonwoven mat of fiber material that is capable of forming a strong bond with the set gypsum of a gypsum core through a mechanical-like interlocking between the interstices of the fibrous mat and portions of the gypsum core. Examples of fiber materials for use in nonwoven mats include inorganic materials such as glass fibers, ceramic fibers, carbon fibers, natural fibers, synthetic polymer fibers, and mixtures or blends thereof. Both chopped strands and continuous strands may be used.

In certain embodiments, the mats are nonwoven fiberglass mats. For example, the glass fibers may an average diameter from about 6 to about 17 microns and an average length from about ¼ inch to about 1.5 inch. In certain embodiments, the glass fibers of the fiberglass mat have an average diameter from about 9 to about 17 microns and/or an average length from about ¼ inch to about 1.5 inch. For example, the glass fibers may have an average diameter of 13 microns (i.e., K fibers) and an average length of ¾ inch. In certain embodiments, the nonwoven fiberglass mats have a basis weight from about 1.2 pounds to about 3.0 pounds per 100 square feet of the mat. The fiberglass mats may each have a thickness from about 0.25 mm to about 1.5 mm.

In certain embodiments, the slurry containing the fibers also contains a platy, acicular, or fibrous filler, such as talcs, micas, calcined aluminas, inorganic whiskers or elongated crystals (e.g., calcium sulfates, calcium silicates, calcium aluminates, calcium aluminum sulfates, magnesium sulfates), glitters (e.g., die-cut polymeric or metallic sheets or foils), delaminated clays, wollastonite, or combinations thereof. The shaped filler particles may enhance the binder film formation and/or facilitate dispersion of the fibers in the slurry. In one embodiment, the platy, acicular, or fibrous filler is present in the slurry in an amount from about 0.5 to about 20.0 percent by weight of the slurry. For example, the platy, acicular, or fibrous filler may be present in the slurry in an amount from about 1.0 to about 5.0 percent by weight of the slurry. In certain embodiments, depositing the slurry onto the fibrous web includes curtain coating, slot coating, or spray application.

The binder of the hybrid nonwoven mat may include any suitable binder material, such as polymeric emulsions or resins. In certain embodiments, the binder is an acrylic emulsion, styrene-butadiene-rubber (SBR), styrene-butadiene-styrene (SBS), ethylene-vinyl-chloride (EVCl), poly-vinylidene-chloride (PVdCl) and poly(vinylidene) copolymers, modified poly-vinyl-chloride (PVC), poly-vinyl-alcohol (PVOH), ethylene-vinyl-acetate (EVA), poly-vinyl-acetate (PVA) and polymers and copolymers containing units of acrylic acid, methacrylic acid, and their esters and derivatives thereof (acrylic-type polymers), such as styrene-acrylate copolymers. In one embodiment, the binder is a hydrophobic, UV resistant polymer latex binder. For example, the hydrophobic, UV resistant polymer latex binder adhesive may be based on a (meth)acrylate polymer latex, wherein the (meth)acrylate polymer is a lower alkyl ester, such as a methyl, ethyl or butyl ester, of acrylic and/or methacrylic acids, and copolymers of such esters with minor amounts of other ethylenically unsaturated copolymerizable monomers (such as stryrene) which are known to the art to be suitable in the preparation of UV resistant (meth)acrylic polymer latexes. In certain embodiments, the binder is a polymeric resin, such as urea, melamine, silicone, poly-acrylic acid, acrylate, epoxy, polyurethane, phenonic resins, or combinations thereof.

Any suitable method may be used to apply binder coating to the mat, such as roller coating, curtain coating, knife coating, spray coating and the like, including combinations thereof. In one embodiment, applying the binder onto the hybrid nonwoven mat includes curtain coating. For example, the binder may be applied in an amount from about 0.3 pounds to about 1.0 pounds of binder per 100 square feet of mat, as measured on a solid basis. Following application of the binder to the mat, the composition may be dried to cure the coating, usually by heat to form the binder-coated mat. Thus, coated mats may be provided having a dried, adherent coating applied to one of their surfaces. In certain embodiments, the method further includes drying the hybrid nonwoven mat in an oven.

In certain embodiments, the method also includes forming the fiberglass or fibrous web in a wet-laid process. For example, forming a fibrous web in a wet-laid process may include dispersing fibers in an aqueous solution to form a fiber slurry, and depositing the fiber slurry on a wire belt to drain a liquid medium therefrom and form a nonwoven fibrous web. In certain embodiments, the fibrous web is wet when the fiber slurry is deposited thereupon. In other embodiments, the fibrous web has been dried prior to application of the fiber slurry thereupon.

For example, the fiberglass or other mat fibers, may be wet-formed into a continuous non-woven web of any workable width, have the fiber slurry deposited thereupon, be coated with the binder, and then dried to remove excess water and cure the binder to form a fibrous mat. Drying may occur in one or more steps, after each stage (i.e., after formation of the fibrous mat, after application of the fiber slurry, and after application of the binder), after application of the binder, or any combination thereof.

In certain embodiments, the method also includes combining the binder-coated hybrid nonwoven mat with a gypsum panel material to form a mat-faced gypsum panel. For example, combining the binder-coated hybrid nonwoven mat with the gypsum panel material may include depositing a gypsum slurry onto a fibrous surface of the binder-coated hybrid nonwoven mat. In other embodiments, the method also includes combining the fibrous mat with a gypsum panel material to form a mat-faced gypsum panel prior to depositing the slurry onto the fibrous mat or prior to applying the binder onto the hybrid nonwoven mat. For example, these coated hybrid mats may be combined with a panel material to form the facing material for gypsum, foam, insulation, or cementitious boards, as well as membranes, shingles, underlayments, laminates, flooring membranes or tiles, or ceiling tiles.

In certain embodiments, a gypsum, or other panel material, slurry or resinous liquid is applied onto a non-coated surface of a hybrid mat as a carrier substrate, i.e., the slurry is applied on a surface of the mat opposite the surface to which the binder was applied. In certain embodiments, a gypsum slurry contains excess water (i.e., water in excess of that needed to hydrate the calcined gypsum from which the slurry is made). Reinforcing fibers may also be included in the gypsum slurry. After the panel material slurry is applied onto a surface of the hybrid mat, the panel material slurry and the mat are dried to form the mat-faced panel. In certain embodiments, applying the binder to the surface of first mat occurs after the mat-faced panel is formed, i.e., after the panel material and mat have been combined before or after panel drying. A gypsum sandwich structure (i.e., a gypsum slurry core with one or two mat faces) may be subsequently dried to evaporate the excess water from the gypsum slurry and set the gypsum core.

The hybrid mats may be coated or uncoated upon contacting the panel material, such as gypsum slurry. In certain embodiments, both first and second hybrid mats are pre-coated on the surfaces opposite the gypsum slurry. For example, coated hybrid mats may be manufactured in a pre-fabricated form. In certain embodiments, the binder coating is applied on the hybrid mats after they are adhered to the core materials, which is cured afterwards.

The gypsum slurry may be applied on the non-coated side of a horizontally oriented moving web of pre-coated or uncoated mat. A second mat may be applied onto the surface of the slurry opposite the first mat. The mats may both be pre-coated, in which case the surfaces opposite the coated surfaces are contacted to the panel material slurry. For example, another moving web of a mat may be placed on the upper free surface of an aqueous gypsum slurry. The gypsum slurry is sandwiched between the coated fibrous mats. Using pre-coated fibrous mats may allow the use of less coating and allow the fibrous mat to be saturated with a gypsum slurry without excessive bleed through. This saturating helps to insure a maximum bond of the fibrous mat to the gypsum core.

Binder-coated hybrid mat-faced panels may be manufactured on any suitable apparatus known to those of ordinary skill in the art. For example, the apparatus may include a board line for transporting a first hybrid mat, an application mechanism configured to apply a gypsum, or other panel material, slurry onto a surface of the first mat, a conveyor configured to apply a second hybrid mat onto a surface of the slurry opposite the first mat, such that a surface of the second mat contacts the slurry. The sandwich structure, i.e., the slurry and two mats, may be transported to a dryer for drying the gypsum sandwich structure, during which the gypsum sets and hardens. For example, the dryer may be an oven operated at a temperature to heat and dry the sandwich structure.

The apparatus may also include a coating applicator, which is configured to apply a binder coating to the surface of the first mat or the second mat opposite the slurry, i.e., the outward-facing surface of the first mat or the second mat. In certain embodiments, the coating applicator is configured to apply the coating to the first mat before the sandwich structure is dried. In some embodiments, applying the coating to the second mat on the top of sandwich is more convenient before the sandwich structure is dried. In alternative embodiments, the coating applicator is configured to apply the coating to the first mat or the second mat after the sandwich structure is dried. In still other embodiments, the coating applicator may be present in an earlier stage of the process, during the mat manufacturing. In these embodiments, the coating applicator may be configured to apply the binder coating before or after drying of the wet mats occurs. For example, the mats may be manufactured from a series of slurries containing dispersed fibers that is applied on a wire belt to drain excess water. Optional additives, such as binders, may be applied to the wet mat, and the binder coating may be applied to a surface of the mat either before or after it is dried.

In certain embodiments, the apparatus includes a transfer mechanism configured to overturn the sandwich structure. In certain embodiments, the apparatus includes a cutting mechanism to cut the continuous sandwich into panels having the desired dimensions. In certain embodiments, a roller or a forming plate compresses the sandwich assembly to the desired thickness. The dry ingredients from which the panel core is formed may be pre-mixed and fed to a mixer, such as a pin mixer. Water and other liquid constituents, such as soap, used in making the core may be metered into the mixer and combined with the desired dry ingredients to form the slurry, (e.g., the aqueous gypsum slurry). Foam (e.g., soap) may be added to the slurry in the mixer to control the density of the resulting core and/or gypsum layers. The slurry may be dispersed through one or more outlets from the mixer onto a moving sheet (e.g., nonwoven fibrous mat), which is indefinite in length and is fed from a roll thereof onto a board line and advanced by conveyor. Another mat may be fed onto the top of the slurry to form a sandwich structure.

These methods advantageously produce improved coated glass mats for gypsum board facing that may be manufactured in an in-line process. The disclosed hybrid mats address the issues experienced by other coated glass mats, such as low tensile strength, gypsum slurry bleed-through, excessive adhesive absorption, fiber disengagement/dusting/ itchiness, and mat brittleness, by uniformly depositing a relatively small amount of fibers on the surface of a fiberglass or other fiber mat prior to application of the binder to the surface of the mat. Without being bound by a particular theory, it is believe that the greater fiber density of the fibers on the surface of the glass mat provides for the formation of a substantially continuous binder film and increases overall mat strength. The fibers also hold the brittle glass fibers (or other mat fibers) underneath and reduce fiber disengagement and itchiness. While other fiberglass mats may incorporate shorter or thinner glass fibers in an attempt to achieve continuous binder film formation, use of such short or micro glass fibers compromises mat strength and resists gypsum slurry penetration. Using fibers on the exposed surface of the mat instead of glass microfibers through the depth of the mat allows the fibrous mat to be stronger and facilitate gypsum slurry penetration that improves the mat adhesion to the gypsum core. The use of fibers on the surface of the fibrous mat also increases nail pull resistance and mat toughness.

Mats and Panels

Figure 1:
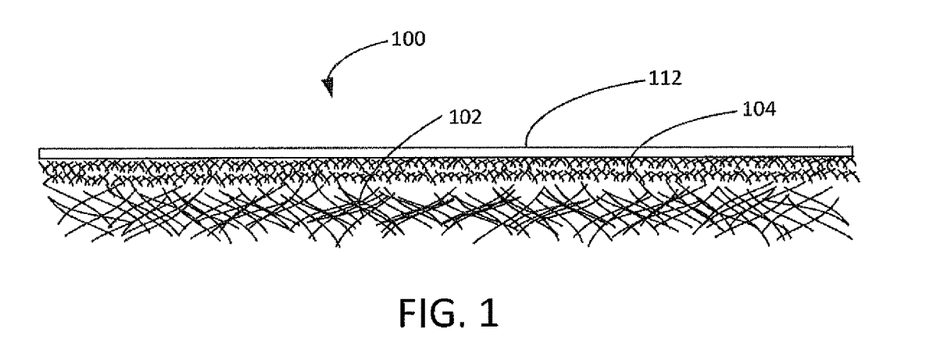
FIG. 1 is a cross-sectional view of an embodiment of a binder-coated hybrid nonwoven mat.

Hybrid nonwoven mats and panels faced with at least one hybrid nonwoven mat are also disclosed herein. In certain embodiments, as shown in FIG. 1, a hybrid nonwoven mat 100 includes a nonwoven fiberglass or other fibrous mat 102, fibers 104 dispersed on the nonwoven mat 102 in a nonwoven configuration, and a binder 112 coating a surface of the fibers (i.e., a surface of the fibers or a combination of the fibers and mat fibers of the nonwoven fibrous mat) 104 opposite the nonwoven mat 102. In certain embodiments, the fibers 104 are sized and present in an amount such that the binder 112 forms a substantially continuous film. For example, the fibers may be selected to have an average length, diameter, aspect ratio, and/or strength that is suitable to achieve the desired binder coating effect.

Depending on the size and amount of fibers dispersed on the nonwoven mat, the binder may coat only fibers or a combination of fibers and mat fibers of the nonwoven fibrous mat. In certain embodiments, the binder coats a layer of the hybrid nonwoven mat that has a fiber to fibrous mat fiber ratio of at least 50:50 (i.e., at least half of the surface area of the layer coated with the binder comprises fibers).

In certain embodiments, the fibers are present in an amount from about 0.1 to about 10 percent by weight of the fibrous mat. For example, the fibers may be present in an amount from about 0.5 to about 2.0 percent by weight of the fibrous mat.

In certain embodiments, the fibers may be selected such that they are sized and provided in an amount such that the binder coating may be applied to form a substantially continuous film. For example, the fibers may be selected such that the coated hybrid mat displays an air permeability of less than 200 ft$^3$/ft$^2$/min. For example, the fibers may be shorter or longer than the mat fibers of the fibrous mat, such as from about 20 percent to about 150 percent of the length of the mat fibers of the fibrous mat. In certain embodiments, the fibers have an average aspect ratio from about 100 to about 30,000. In certain embodiments, the fibers have an average length from about 0.1 inch to about 1.5 inch. For example, the fibers may have an average length from about ⅛ inch to about ½ inch. In certain embodiments, the fibers have an average diameter from about ⅛ inch to about ¼ inch.

In certain embodiments, the fibers are polymer fibers, natural fibers, glass microfibers, or combinations thereof. In certain embodiments, the polymer fibers are aramid (e.g., Kevlar, Nomex, Twaron), polyester, polypropylene, acrylics, nylon, cellulose, melamine, polyolefin, rayon, or combinations thereof. For example, the glass microfibers may have an average diameter of from about 1 micron to about 7 micron. For example, the glass microfibers may be produced via melt spinning. For example, the natural fibers may include wood pulp, flax, jute, kenaf, hemp ramie, rattan, vine fibers, or combinations thereof.

In certain embodiments, the mat fibers of the fiberglass or other fibrous mat have an average diameter from about 9 to about 17 microns and/or an average length from about ¼ inch to about 1.5 inch.

In certain embodiments, the binder is an acrylic emulsion, styrene-butadiene-rubber (SBR), styrene-butadiene-styrene (SBS), ethylene-vinyl-chloride (EVCl), poly-vinylidene-chloride (PVdCl) and poly(vinylidene) copolymers, modified poly-vinyl-chloride (PVC), poly-vinyl-alcohol (PVOH), ethylene-vinyl-acetate (EVA), poly-vinyl-acetate (PVA) and polymers and copolymers containing units of acrylic acid, methacrylic acid, and their esters and derivatives thereof (acrylic-type polymers), such as styrene-acrylate copolymers. In one embodiment, the binder is a hydrophobic, UV resistant polymer latex binder. For example, the hydrophobic, UV resistant polymer latex binder adhesive may be based on a (meth)acrylate polymer latex, wherein the (meth)acrylate polymer is a lower alkyl ester, such as a methyl, ethyl or butyl ester, of acrylic and/or methacrylic acids, and copolymers of such esters with minor amounts of other ethylenically unsaturated copolymerizable monomers (such as stryrene) which are known to the art to be suitable in the preparation of UV resistant (meth)acrylic polymer latexes. In certain embodiments, the binder is a polymeric resin, such as urea, melamine, silicone, polyacrylic acid, acrylate, epoxy, polyurethane, phenonic resins, or combinations thereof.

Figure 2:
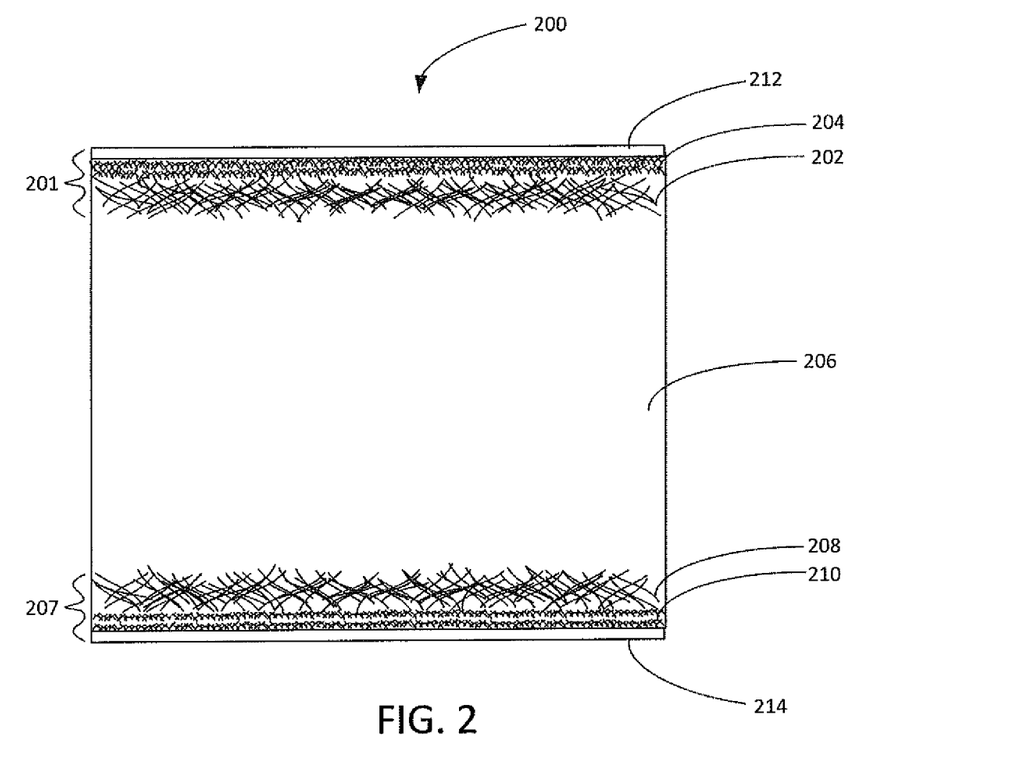
FIG. 2 is a cross-sectional view of an embodiment of a binder-coated hybrid nonwoven mat-faced panel.

In certain embodiments, as shown in FIG. 2, gypsum panels 200 are provided, including a gypsum core 206 having two surfaces, wherein at least one of the surfaces is faced with a hybrid nonwoven mat 201, 207 that includes a nonwoven fibrous mat 202, 208, fibers 204, 210 dispersed on the nonwoven fibrous mat 202, 208 in a nonwoven configuration, and a binder 212, 214 coating a surface of the fibers (i.e., a surface of the fibers or a surface of the fibers and at least a portion of the mat fibers of the fibrous mat) 204, 210 opposite the nonwoven fibrous mat 202, 208, wherein the fibers 204, 210 are sized and present in an amount such that the binder 212, 214 forms a substantially continuous film. The hybrid nonwoven mat may have any properties, or combination of properties, disclosed herein. While reference is made herein to gypsum panels, such coated hybrid mats may be combined with a panel material to form the facing material for gypsum, foam, insulation, or cementitious boards, as well as membranes, shingles, underlayments, laminates, flooring membranes or tiles, or ceiling tiles.

In certain embodiments, the panels have a thickness from about ¼ inch to about 1 inch. For example, the panels may have a thickness of about ½ inch, about ⅝ inch, about ¾ inch, or about ⅞ inch. In certain embodiments, the panels may be much thicker than 1 inch. The panel material, also referred to as a core herein, may be a suitable panel material, such as gypsum or foam. Embodiments of panels disclosed herein may refer to the panel material being gypsum, or a "gypsum core," though it is to be understood that a foam or other panel material may be substituted for the gypsum material.

For example, a foam core may include polyurethane, polyisocyanurate, polystyrene, phenol resin, magnesium-based cement, or combinations thereof. For example, the gypsum core may be similar to those used in other gypsum products, such as gypsum wallboard, dry wall, gypsum board, gypsum lath, and gypsum sheathing. For example, the gypsum core may be formed by mixing water with powdered anhydrous calcium sulfate or calcium sulfate hemihydrate, also known as calcined gypsum, to form an aqueous gypsum slurry, and thereafter allowing the slurry mixture to hydrate or set into calcium sulfate dihydrate, a relatively hard material. The gypsum core may include about 80 weight percent or above of set gypsum (i.e., fully hydrated calcium sulfate). For example, the gypsum core may include about 85 weight percent set gypsum. The gypsum core may also include a variety of additives, such as accelerators, set retarders, foaming agents, and dispersing agents.

In certain embodiments, the core also includes reinforcing fibers, such as chopped glass fibers. For example, a gypsum core may include up to about 1 pound of reinforcing fibers per 100 square feet of panel. For example, a gypsum core may include about 0.3 pounds of reinforcing fibers per 100 square feet of panel. These reinforcing fibers may have a diameter between about 10 and about 17 microns and have a length between about 6.35 and about 12.7 millimeters (¼ to ½ inch).

The core may also include an additive that improves the water-resistant properties of the core. Such additives may include, for example, poly(vinyl alcohol), optionally including a minor amount of poly(vinyl acetate); metallic resinates; wax, asphalt, or mixtures thereof, for example as an emulsion; a mixture of wax and/or asphalt and cornflower and potassium permanganate; water insoluble thermoplastic organic materials such as petroleum and natural asphalt, coal tar, and thermoplastic synthetic resins such as poly(vinyl acetate), poly(vinyl chloride), and a copolymer of vinyl acetate and vinyl chloride, and acrylic resins; a mixture of metal rosin soap, a water soluble alkaline earth metal salt, and residual fuel oil; a mixture of petroleum wax in the form of an emulsion and either residual fuel oil, pine tar, or coal tar; a mixture of residual fuel oil and rosin; aromatic isocyanates and diisocyanates; organopolysiloxanes; siliconates; a wax emulsion and a wax-asphalt emulsion, each optionally with potassium sulfate, alkali, or alkaline earth aluminates, and Portland cement; a wax-asphalt emulsion prepared by adding to a blend of molten wax and asphalt, an oil-soluble, water-dispersing emulsifying agent, and admixing the aforementioned with a solution of case including, as a dispersing agent, an alkali sulfonate of a polyarylmethylene condensation product. Mixtures of these water-resistance additives may also be employed. For example, a mixture of two or more of: poly(vinyl alcohol), siliconates, wax emulsion, and wax-asphalt emulsion of the aforementioned types, may be used to improve the water resistance of the core.

In certain embodiments, the gypsum core has a density from about 130 pounds per 100 square feet to about 300 pounds per 100 square feet. For example, the core may have a density of about 135 pounds per 100 square feet.

One or both faces of the panel core material may be faced with a suitable mat. As shown in FIG. 2, in certain embodiments, both surfaces of the panel material 206 are faced with coated hybrid mats 201, 207. The mats are enmeshed or entangled with the panel material at the surface interfaces. That is, while the panel material, mats, and coatings are shown as separate layers in the figure, it should be understood that overlap of these layers occurs at the layer interfaces.

Figure 3:
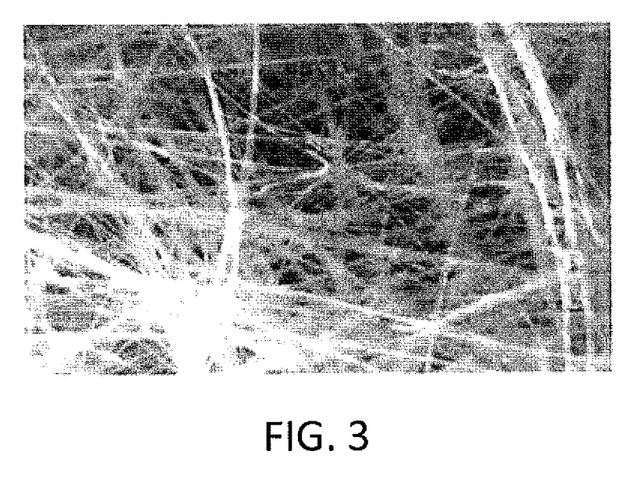
FIG. 3 is a comparative photograph of a fiberglass mat.

It is well known in the industry that nonwoven glass mats on gypsum board surfaces tend to experience fiber disengagement, and cause itchiness and fiber dusting. The glass mat is also abrasive and brittle as an outer surface. In traditional in-line glass mat production, it is common to apply a binder coating to attempt to form a continuous barrier film/layer on the top surface of glass mat. However, achieving such a continuous barrier is very difficult because of the high degree of porosity in the fiberglass mat, as shown in FIG. 3, which is a photograph of a traditional fiberglass base mat.

Figure 4:
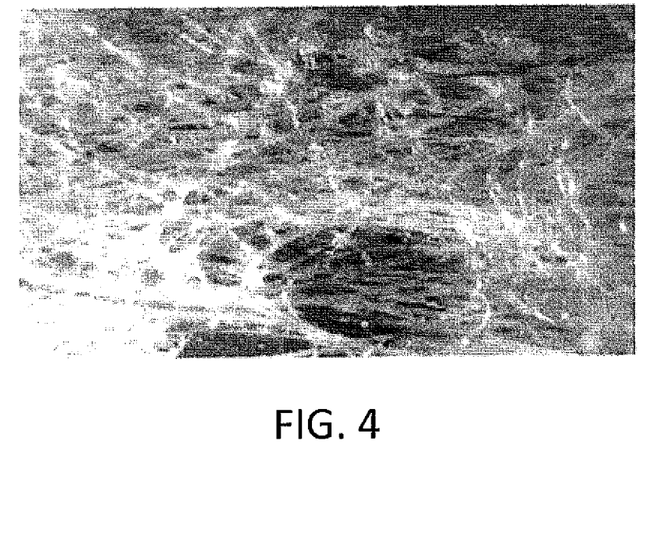
FIG. 4 is a photograph of a binder-coated hybrid nonwoven mat.

By depositing a thin, dense fiber layer on the surface of the fiberglass mat, it was found that a more continuous binder film/coating was much easier to form. Relatively soft fibers, such as polymer or natural fibers, can also improve smoothness, shield the glass fibers or other mat fibers from touching or rubbing, and avoid itchiness and fiber disengagement, as shown in FIG. 4, which is a photograph of a coated hybrid mat. It was also found that flaky filler such as chips, flakes, or glitter, can also be included with the fibers to aid the continuous film formation and reduce porosity, which may be required for gypsum board formation and desired properties (e.g., low gypsum bleed through, water absorption, erosion). The fibers on the glass or other nonwoven mat may also improve strength and toughness of the gypsum board.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A method of making a hybrid nonwoven mat, comprising:
   depositing a slurry comprising glass microfibers and water onto a nonwoven fiberglass web to form a hybrid nonwoven mat in which the glass microfibers are present in an amount of from about 0.5 to about 2 percent by weight of the nonwoven fiberglass web; and
   applying a binder onto the hybrid nonwoven mat to form a binder-coated hybrid nonwoven mat,
   wherein the glass microfibers are sized and deposited in an amount such that the binder forms a substantially continuous film on the hybrid nonwoven mat.

2. The method of claim 1, wherein the glass microfibers are present in the slurry in an amount from about 0.01 to about 2 percent by weight of the slurry.

3. The method of claim 1, wherein the glass microfibers have an average diameter of from about 1 micron to about 7 micron.

4. The method of claim 1, wherein the glass microfibers have an average aspect ratio from about 100 to about 30,000.

5. The method of claim 1, wherein the binder-coated hybrid nonwoven mat displays an air permeability of less than 200 $ft^3/ft^2$/min.

6. The method of claim 1, wherein the glass microfibers have an average length from about 20 percent to about 75 percent of an average length of mat fibers of the nonwoven fiberglass web.

7. The method of claim 1, wherein fibers of the nonwoven fiberglass web have an average diameter from about 9 to about 17 microns and an average length from about ¼ inch to about 1.5 inch.

8. The method of claim 1, wherein the binder coats a layer of the hybrid nonwoven mat comprising a glass microfibers to fiberglass ratio of at least 50:50.

9. A hybrid nonwoven mat, comprising:
a nonwoven fiberglass mat;
glass microfibers dispersed on the nonwoven fiberglass mat in a nonwoven configuration; and
a binder coating a surface of the glass microfibers opposite the nonwoven fiberglass fibrous mat,
wherein the glass microfibers are sized and present in an amount such that the binder forms a substantially continuous film,
wherein the glass microfibers are present in an amount from about 0.5 to about 2 percent by weight of the nonwoven fiberglass mat.

10. The hybrid nonwoven mat of claim 9, wherein the glass microfibers have an average diameter of from about 1 micron to about 7 micron.

11. The hybrid nonwoven mat of claim 9, wherein the glass microfibers have an average aspect ratio from about 100 to about 30,000.

12. The hybrid nonwoven mat of claim 9, wherein the hybrid nonwoven mat displays an air permeability of less than 200 $ft^3/ft^2$/min.

13. The hybrid nonwoven mat of claim 9, wherein mat fibers of the nonwoven fiberglass mat have an average diameter from about 9 to about 17 microns and an average length from about ¼ inch to about 1.5 inch.

14. The hybrid nonwoven mat of claim 9, wherein the glass microfibers have an average length from about 20 percent to about 75 percent of an average length of mat fibers of the nonwoven fiberglass mat.

15. The hybrid nonwoven mat of claim 9, wherein the binder coats a layer of the hybrid nonwoven mat comprising a glass microfibers to fiberglass ratio of at least 50:50.

16. A gypsum panel, comprising:
a gypsum core having two surfaces, wherein at least one of the surfaces is faced with a hybrid nonwoven mat that comprises:
a nonwoven fiberglass mat,
glass microfibers dispersed on the nonwoven fiberglass mat in a nonwoven configuration, and
a binder coating a surface of the glass microfibers opposite the nonwoven fiberglass mat, wherein the glass microfibers are sized and present in an amount such that the binder forms a substantially continuous film,
wherein the glass microfibers are present in an amount from about 0.5 to about 2 percent by weight of the nonwoven fiberglass mat.

17. The gypsum panel of claim 16, wherein the glass microfibers have an average length from about 20 percent to about 75 percent of an average length of mat fibers of the nonwoven fiberglass mat.

18. The gypsum panel of claim 16, wherein fibers of the nonwoven fiberglass mat have an average diameter from about 9 to about 17 microns and an average length from about ¼ inch to about 1.5 inch.

19. The gypsum panel of claim 16, wherein the binder coats a layer of the hybrid nonwoven mat that comprises a glass microfibers to fiberglass ratio of at least 50:50.

* * * * *